(12) United States Patent
De Vaan et al.

(10) Patent No.: US 8,553,153 B2
(45) Date of Patent: Oct. 8, 2013

(54) OPERATION MODE ADJUSTMENT DEVICE AND METHOD OF ADJUSTING AN OPERATION MODE OF AN ELECTRONIC PRODUCT

(75) Inventors: Adrianus Johannes De Vaan, 'S-Hertogenbosch (NL); Erik Lieuwen, Nuenen (NL)

(73) Assignee: T.P. Vision Holding B.V., Eindhoven (NL)

( * ) Notice: Subject to any disclaimer, the term of this patent is extended or adjusted under 35 U.S.C. 154(b) by 1385 days.

(21) Appl. No.: 11/814,378

(22) PCT Filed: Jan. 17, 2006

(86) PCT No.: PCT/IB2006/050166
§ 371 (c)(1),
(2), (4) Date: Jul. 20, 2007

(87) PCT Pub. No.: WO2006/077532
PCT Pub. Date: Jul. 27, 2006

(65) Prior Publication Data
US 2009/0290069 A1    Nov. 26, 2009

(30) Foreign Application Priority Data
Jan. 21, 2005    (EP) .................................. 05100381

(51) Int. Cl.
*H04N 5/57*    (2006.01)
*H04N 5/58*    (2006.01)

(52) U.S. Cl.
USPC .................. 348/602; 725/12; 725/13; 725/19

(58) Field of Classification Search
USPC ........................................ 348/602; 725/9–21
See application file for complete search history.

(56) References Cited

U.S. PATENT DOCUMENTS

| | | | |
|---|---|---|---|
| 4,641,191 A | 2/1987 | Sutton et al. | |
| 5,808,703 A * | 9/1998 | Karlqvist | 348/734 |
| 6,263,503 B1 | 7/2001 | Margulis | |
| 6,618,045 B1 * | 9/2003 | Lin | 345/207 |
| 2003/0046685 A1 | 3/2003 | Srinivasan et al. | |
| 2003/0107675 A1 | 6/2003 | Dew et al. | |
| 2003/0156073 A1 * | 8/2003 | Van Zon | 345/1.1 |
| 2004/0203846 A1 * | 10/2004 | Caronni et al. | 455/456.1 |
| 2004/0237096 A1 * | 11/2004 | Cain et al. | 725/13 |

(Continued)

FOREIGN PATENT DOCUMENTS

| | | |
|---|---|---|
| GB | 2248001 A | 3/1992 |
| JP | 11215443 A | 8/1999 |

OTHER PUBLICATIONS

Fisher-Price; Laugh & Learn Anleitung, 2004, Fisher Price, XP002382163, p. 2.

*Primary Examiner* — Jason J Chung
(74) *Attorney, Agent, or Firm* — Shimokaji & Associates, PC

(57) ABSTRACT

An operation mode adjustment device (309) for adjusting an operation mode of an electronic product (300) comprises a detection unit (303) for automatically detecting whether an environment in which an electronic product (300) connectable to the operation mode adjustment device (309) is currently located is a shop environment, and an adjusting unit (304) for automatically adjusting an operation mode of the electronic product (300) based on whether the detected environment in which the electronic product (300) connectable to the operation mode adjustment device is currently located is a shop environment.

17 Claims, 3 Drawing Sheets

(56) References Cited

U.S. PATENT DOCUMENTS

2005/0024538 A1* 2/2005 Park et al. .................. 348/602
2005/0048989 A1* 3/2005 Jung ......................... 455/456.1
2005/0078226 A1* 4/2005 Matoba ....................... 348/734
2007/0260988 A1* 11/2007 Miller ......................... 715/744

* cited by examiner

OPERATION MODE ADJUSTMENT DEVICE AND METHOD OF ADJUSTING AN OPERATION MODE OF AN ELECTRONIC PRODUCT

FIELD OF THE INVENTION

The invention relates to an operation mode adjustment device.

The invention further relates to an electronic product.

The invention also relates to a method of adjusting an operation mode of an electronic product.

Moreover, the invention relates to a program element.

Furthermore, the invention relates to a computer-readable medium.

BACKGROUND OF THE INVENTION

In the field of electronic entertainment apparatuses, many new applications are currently developed and introduced on the market. Depending on the environment in which such an electronic entertainment apparatus is used, an appropriate operation mode should be adjusted to correspond to the environment in which it is to be used.

U.S. Pat. No. 4,641,191 discloses a video display system which is normally operated to produce a low brightness display. A viewer sensing apparatus senses the presence of a viewer by reflection of ultrasonic energy and operates the display system for instantaneously supplying full power to the system to produce a normal brightness display.

US 2003/0046685 A1 discloses a method of determining whether a television set is on and in the proximity of a sensor. In particular, the system includes a television set and an audio sensor being situated in the same room as the television set. When the television set is turned on, it emits an audio signal and the audio sensor may detect this signal. It may thus be determined whether the audio signal picked up by the audio system originates from a nearby television set and allows disregarding of audio signals emitted in a neighboring room.

In order to properly offer an electronic product to a potential client, an operation mode of such a product should be adjusted accordingly when it is in a shop environment. For instance, in a shop environment, it is advantageous to adjust an operation mode so that the electronic product is presented in the full performance operation mode. In contrast to this, in a home environment, for practical and permanent use, the settings should guarantee a long lifetime of the electronic product.

However, it is very expensive and not very reliable when a salesperson in a shop has to adjust an operation mode of an electronic product in a manual manner so as to correspond to the frame conditions of a shop environment.

OBJECT AND SUMMARY OF THE INVENTION

It is an object of the invention to allow adjustment of an operation mode of an electronic product with reasonably little effort.

In order to achieve the object defined above, an operation mode adjustment device, an electronic product, a method of adjusting an operation mode of an electronic product, a program element and a computer-readable medium have the features as defined in the independent claims.

The operation mode adjustment device for adjusting an operation mode of an electronic product according to the invention comprises detecting means for automatically detecting whether an environment in which an electronic product connectable to the operation mode adjustment device is currently located is a shop environment, and adjusting means for automatically adjusting an operation mode of the electronic product based on whether the detected environment in which the electronic product connectable to the operation mode adjustment device is currently located is a shop environment.

Furthermore, an electronic product is provided, comprising an operation mode adjustment device having the above-mentioned features.

A method of adjusting an operation mode of an electronic product comprises the steps of automatically detecting whether an environment in which an electronic product is currently located is a shop environment, and automatically adjusting an operation mode of the electronic product based on whether the detected environment in which the electronic product is currently located is a shop environment.

Moreover, a program element is provided, which, when being executed by a processor, is adapted to carry out a method of adjusting an operation mode of an electronic product in accordance with the above-mentioned method steps.

Moreover, a computer-readable medium is provided, in which a computer program is stored which, when being executed by a processor, is adapted to carry out a method of adjusting an operation mode of an electronic product in accordance with the above-mentioned method steps.

The adjustment of an operation mode of an electronic product according to the invention can be realized by a computer program, i.e. by means of software, or by using one or more special electronic optimization circuits, i.e. in hardware or in a hybrid form, i.e. by means of software components and hardware components.

The characterizing features according to the invention particularly have the advantage that it is automatically detected whether the electronic product connected to the operation mode adjustment device is currently located in a shop environment in which the electronic product is presented to clients. By detecting the presence of such an environment and by adjusting the operation mode to the detected environment, manual adjustment, which requires special expertise and involves high costs, can be dispensed with. The system of the invention achieves a reliable adjustment without involving humans by detecting whether the current environment is either a shop or a home environment.

Since the system according to the invention may automatically detect any change of environment (for instance, when the electronic product has been sold to a consumer in a shop environment and is transported to the consumer's home environment), manual readjustment of the settings of the electronic product can be dispensed with when the client switches on the electronic product in a home environment, in which settings that may be different from a shop environment may be preferred. The operation-mode adjustment device according to the invention has particularly adapted detecting means, which automatically detect whether the current environment is either a shop or a home environment. This detection may be based on the recognition that physical frame conditions which are typical of a shop are usually different as compared with frame conditions which are typical of a house. Consequently, the settings of the electronic product are adjusted accordingly so that the current operation mode of the electronic device is flexibly adjusted to the current environment.

Within the scope of this application, the term "shop environment" particularly denotes an environment in which an electronic product is presented to potential clients or consumers. Such a shop environment includes electronic product shops and (department) stores, but also places like industry fairs or exhibitions where electronic products are presented to resellers. The term "shop environment" further covers presentation rooms in which electronic products are presented to the public and/or to experts. Another appropriate expression for shop environment might be commercial environment or trade environment.

In contrast to a shop environment, a "home environment" particularly denotes a place in which a user or consumer arranges the electronic product for long or permanent use. This includes a private apartment or house, as well as a workplace where a monitor as an example of an electronic product is used. A "home environment" may also be a bar, a restaurant or a hotel where a television set as an example of an electronic product is operated.

Particularly, the picture settings of a television as an electronic product should be different in a shop environment than at home. In the shop, it may be advantageous that the customers can make comparisons with electronic apparatuses relating to other brands, and as such the set should preferably be operated in an operation mode having a high level of functionality (for instance, high brightness and rich colors). This may help to immediately attract the customer's attention and convince him of the quality, receiving his preference to appreciate or even buy this set. In a home environment, however, the set should give an optimum video performance with a setting for a long lifetime.

By flexibly adjusting an operation mode which is specially adapted to the current environment, the system according to the invention is optimized to the frame condition related to this environment. Simultaneously, a long lifetime of the electronic product and proper sales and distribution results are achieved.

Furthermore, the operation mode changes related to different environments may be implemented in the electronic apparatus (like a TV) without being noticed by the viewers so that they are not bothered with a permanent update of an operation mode. This means that the electronic product may recognize by itself whether the current environment is a shop or alternatively a home environment, or another environment, and may select a corresponding TV setting automatically.

According to an embodiment of the invention, the shop-identifying operation mode adjustment device according to the invention is implemented in an electronic product like a television set provided with an ultrasonic speaker and a microphone. Such an ultrasonic speaker may emit sound signals including an identifier to indicate that it is an electronic product of a particular company (for instance, a Philips™ television). The microphone receives these ultrasonic identifiers. At the moment when the microphone receives identifiers within a relatively short time interval, the shop identifying operation mode adjustment device implemented in or attached to the television set decides that it is present in a shop environment, and the settings of the television set are switched to the shop mode. At the moment the microphone receives identifiers within longer time intervals, the TV setting may switch to the home mode.

In a preferred embodiment of the invention, the operation mode adjustment device thus makes use of an ultrasound signal. Each electronic product of a company (for instance, each Philips™ television) may be equipped with a low-cost ultrasonic speaker adapted to emit an ultrasound sound wave with an identifier so as to indicate that it is a Philips™ television. Moreover, each Philips™ television may be equipped with a (low-cost) microphone, which is capable of receiving the ultrasonic identifier signals.

In a scenario in which a large number of such TVs equipped with an operation mode adjustment device are located in each other's vicinity, the operation mode adjustment device of the televisions receives identifier signals with small time intervals between two subsequent signals, and as such it may be recognized as a "TV-crowded" area or, in other words, a shop environment. In that case, the TVs may be given the shop mode settings, which have the optimal effect to attract customers in a shop environment.

In a scenario in which a small number of such TVs are located in each other's vicinity (for instance, in a home environment, where typically one, two or three other televisions are present in an apartment), each TV receives the identifier signals with a longer time interval between subsequent signals, and as such receives an indicator that the environment is not a "TV-crowded" area, i.e. not a shop environment. In that case, the TVs may be given the home mode settings, which have the optimal effect of experiencing the programs or watching movies on the TV at home.

Particularly, the system of the invention describes the broadcasting and/or reception of coded information that may be taken as a basis for a decision whether the current environment is a home environment or any other type of environment. Furthermore, the number of such received codes within a time interval may be counted, wherein the "frequency" at which the signals are received can be taken as a basis for the decision which kind of environment is present. Based on this decision, the settings of an electronic apparatus like a television can be automatically changed to either the shop or the home mode, or to any other mode. For this purpose, it may be checked if a plurality of TVs is present in the proximity of the television including the operation mode adjustment device. The operation mode may be related to the picture quality of a display device.

Thus, the invention provides an operation mode adjustment device for an electronic product, so that a television or a monitor set may be provided with a shop detector, such that the set can have its optimal picture quality setting in the shop. The signals interchanged by different operation mode adjustment devices according to an embodiment of the invention may be ultrasonic sound, or electromagnetic radiation signals such as infrared or radio frequency signals.

Particularly, the invention provides a shop identifier wherein a TV senses if it is present in a shop environment or in a user environment, and adjusts its setting to the current location. A method of realizing this may include the periodical emission of an ultrasonic signal, sensing such signals emitted by other TV sets, and, if the signals are more frequent, determining that the TV is in a shop environment, or otherwise determining that the shop is a home environment. The invention may be applied particularly to any type of consumer display products such as televisions and customer monitors.

Referring to the dependent claims, further preferred embodiments of the invention will be described hereinafter.

Preferred embodiments of the operation mode adjustment device of the invention will now be described. These embodiments also apply to the electronic product, the method of adjusting an operation mode of an electronic product, the program element and the computer-readable medium. In the operation mode adjustment device, the detecting means may be adapted to detect whether the environment in which the electronic product is currently located is a shop environment by analyzing received remote control signals generated by a user-controlled remote control unit for controlling the electronic product. According to this embodiment, the presence or absence or frequency of valid or invalid remote control signals originating from a remote control unit of the electronic product is used as a criterion to decide whether the current environment is a home or a shop environment, or any other environment. In a home environment, a user using the electronic product (for instance, a TV) usually utilizes a remote control (RC) to control the functionality or operation mode of the electronic product (for instance, switching between different TV channels, adjusting loudness or image parameters). Under such "normal use" conditions, the detecting means may use a typical user behavior scheme concerning the use of the remote control to decide whether the current environment is probably a home or a shop environment. Based on the result of such an analysis, the adjusting means may then set the electronic product to a corresponding operation state.

When a product, for instance, a TV, is placed in a shop, a high-performance operation mode is usually desired. This operation mode may be denoted as the "shop mode". This shop mode includes several dedicated settings and adjustments, which usually differ from settings that are desired by consumers when operating the apparatus at home. As a basis for a decision to automatically switch the electronic product to the shop mode, the operation mode adjustment device may detect remote control signals, wherein the absence of valid remote control mode signals or commands can be used to trigger the electronic product to acquire the shop mode.

A scenario may occur in which a user at home does not use the remote control for a comparatively long time (for instance, when he falls asleep). In this case, it may happen that the operation mode adjustment device controls the electronic product to acquire the shop mode. However, in such a situation, the set may be adapted in such a way that pressing one button (for instance, any button or a specifically dedicated button on the remote control or on the electronic product) will cause the electronic product to operate in the home mode again, i.e. the shop mode is switched off.

It is an advantage of the invention that a salesman no longer needs to present the set by manually switching to a demonstration mode or shop mode. In contrast to this, according to the invention, the set will be controlled automatically to acquire this mode (in which optimized settings for the presentation in a shop may be adjusted).

When an electronic product (like a TV set) leaves a factory, its place of destination is not always clear. Some of the electronic products will go directly to a customer, whereas other electronic products will end up on a shop floor. The latter electronic products are sold with little effort and will have to be presented to potential customers in an attractive manner. The environment in a shop is usually different than in a user's living room (for instance, the light conditions). According to the invention, it is sufficient that the electronic product is simply installed in a shop without the requirement to manually adjust an operation mode specifically tuned for shop conditions. The operation mode adjustment device will detect whether there are valid remote control commands originating from a remote control device, which remote control device corresponds to the electronic product. When the electronic product does not receive any (or a sufficient number per time unit of) valid control commands within a predefined time interval, the operation mode adjustment device may conclude that the current environment is probably a shop environment. Consequently, the current operation mode may be adjusted or switched automatically to the shop mode. This operation mode may be maintained until no valid remote control commands are received.

The described embodiment of the invention can be implemented in all electronic apparatuses which are operable with a remote control unit, such as a TV, a video recorder, a DVD player, a hi-fi system, or the like.

Within the scope of this application, the term "valid" remote control command specifically means a remote control command which is intended to be used as such by the corresponding electronic apparatus, so that this apparatus is capable of reacting to this remote control command. When a Philips™ TV as an electronic apparatus receives a command for an AV receiver or for a TV which is not a Philips™ TV, this command will be recognized by the Philips™ TV as a non-valid remote control command and will not switch from the shop mode to the home mode. Thus, the system according to the invention can be realized as a standard TV with its own remote control unit. Hardly any additional costs are involved; according to the described embodiment, only a simple switch algorithm is needed to switch between the shop mode and the home mode.

A scenario may occur in which an electronic product (having a remote control signal analysis-based operation mode adjustment device implemented therein) is located in a shop and is currently operated in the shop mode, and a potential customer wants to test the product by using the remote control unit. When the potential user operates the remote control unit so as to generate a valid remote control signal, the electronic product may be switched to the "normal mode", i.e. the shop mode is switched off. When the user has finished testing, the set may switch back to the shop mode in the absence of any further valid remote control signal for a predetermined time interval. It may also switch back to the shop mode upon receiving (a sufficient number per time unit of) invalid remote control signals originating from other electronic products located in the store. The remote control detector of the TV will receive such remote control commands from other remotes, but a micro-controller of the TV may recognize that these commands are not intended for this particular TV (i.e. they are not valid remote control commands for this TV), and will ignore them.

In a scenario in which the set is at home, and if no remote control signals are received, the set may automatically go to the shop mode. The system may resume the home mode by any user operation or by a particular user operation of the remote control unit.

At home, a remote control unit often controls electronic apparatuses. For instance, a TV is controlled by a "Program up" button, a "Program down" button, a "Volume up" button, or by a "Volume down" button. Furthermore, a user may switch the TV to the videotext mode. By using this information, particularly by using read remote control statistics, it can be decided, for instance, in a software-based manner, to go to the shop mode. For instance, when the "Program up" button or the "Program down" button has not been used for six hours, the set may go to the shop mode.

In the operation mode adjustment device, the detecting means may be adapted to detect whether the environment in which the electronic product is currently located is a shop environment by analyzing a frequency of occurrence of received valid remote control signals generated by a user-controlled remote control unit for controlling the electronic product. When a number of valid remote control commands per time interval is exceeded, or when no valid remote control commands have been received for a particular time interval, this information may be used as an indication that a shop environment is present.

Still referring to the described embodiment, the detecting means may be adapted to determine that the environment in which the electronic product is currently located is a shop environment when a frequency of occurrence of valid remote control signals exceeds a predefined threshold. This threshold can be defined and programmed in the factory, or may be user-defined.

Furthermore, the detecting means may be adapted to detect whether the environment in which the electronic product is currently located is a shop environment by statistically analyzing received valid remote control signals generated by a user-controlled remote control unit for controlling the electronic product. Particularly, a histogram analysis of received valid remote control signals may be performed. An analysis of the remote control signals may be compared with a typical scheme of users about their use of remote controls at home. If there is a comparatively large deviation, it may be decided that the environment is not a home environment, so that the shop mode may be adjusted.

Moreover, the detecting means may be adapted to detect whether the environment in which the electronic product is currently located is a shop environment by analyzing received remote control signals generated by a user-controlled remote control unit for controlling the electronic product and concerning information related to an identification of the electronic product and/or a timing of the received remote control signals.

The detecting means may be adapted to receive an identification signal emitted by another operation mode adjustment device for adjusting an operation mode of another electronic product. In other words, different operation mode adjustment devices may each emit an identification signal, for instance, periodically in time, wherein different operation mode adjustment devices may be adapted to detect such an identification signal. The sequence of received identification signals (for instance, the intensity and/or number of detected signals per time unit) can be taken as a basis for the decision whether a shop or a home environment is present. In the case of a shop environment, it is likely that many electronic products having operation mode adjustment devices implemented are present, so that a large amount of identification signals per time unit can be expected. Thus, a threshold value can be defined, wherein the presence of a shop environment may be assumed when the number of received identification signals per time unit exceeds this threshold value. Otherwise, it may be decided that a home environment is present.

The detecting means may be adapted to receive an ultrasonic signal or an electromagnetic radiation signal as an identification signal. In the case of an ultrasonic detector, the detecting means may include a microphone, which has low manufacturing costs. It is particularly advantageous to implement an ultrasonic detector, since ultrasonic sound usually remains within one room, and only a very small portion of ultrasonic sound wave intensity may be transmitted through a wall to enter another room. Thus, by implementing ultrasonic detection, it can be securely prevented that other apparatuses are disturbed. In the case of, for instance, an electromagnetic radiation detector, the detection means may include an antenna or the like.

Particularly, the detecting means may be adapted to receive a high-frequency signal or a radio-frequency signal or an infrared signal as an electromagnetic radiation signal. Electromagnetic radiation in these frequency ranges is not perceivable by a human being, so that the function of the operation mode adjustment device will not become apparent to a user.

Alternatively or additionally to the described embodiments, the detecting means may be adapted to receive an identification signal previously emitted by the operation mode adjustment device itself and reflected by an environment in which an electronic product connectable to the operation mode adjustment device is currently located. For instance, the detecting means can receive an identification signal emitted by the operation mode adjustment device itself which is reflected by the environment, for instance, by walls or other physical objects in this environment. Since the frame conditions for such reflections are usually different in a home environment as compared to a shop environment, the reflection characteristics can also be taken as a decision which environment is present. For instance, an audio test signal can be emitted, and the amount of natural reverberation of the environment can be measured. The measured characteristics can be taken as criteria to decide which environment is present. For instance, the reverberation characteristics of a church are very different from those of a typical home environment having much audio-absorbing furniture.

The operation mode adjustment device may include an emitter unit adapted to emit an identification signal. Particularly, an operation mode adjustment device may have both a detecting means and an emitter unit.

Such an emitter unit can be adapted to periodically emit an identification signal, for instance, once a minute or the like. The number of identification signals per time unit received by the detecting means and originating from other operation mode adjustment devices can be taken as a basis for the decision whether an area with a plurality of electronic products is present (for instance, in a shop environment), or whether only a few electronic products are present in the environment (for instance, in a home environment).

The emitter unit may be adapted to emit an identification signal including the information that the electronic product is related to a particular company. For instance, if a company such as Philips™ provides each of its electronic products with a low-cost operation mode adjustment device, these devices may interchange signals in a shop so that the presence of a shop environment can be detected with great accuracy.

The emitter unit may be adapted to emit an ultrasonic signal or an electromagnetic radiation signal as an identification signal. Such an ultrasonic signal has the advantage that it is absorbed by material delimiting an environment (for instance, walls) so that no disturbing signals are transported to neighboring places.

Alternatively, the emitter unit may be adapted to emit a high-frequency (particularly a radio-frequency, RF) signal or an infrared signal as an electromagnetic radiation signal. These signals, which are harmless to human beings, may be generated and detected with little effort (for instance, with a single antenna) and are not perceivable by a user.

Particularly, the operation mode adjustment device may have the adjusting means adapted to adjust an operation mode based on whether the detected environment is a shop or a home environment. Thus, two or more different operation modes can be pre-stored in the device (for example, an operation mode optimized for home conditions, and another operation mode optimized for shop conditions).

The adjusting means may be adapted to adjust an operation mode based on a number of identification signals emitted per time unit by other operation mode adjustment devices and detected by the detecting means. The number of identification signals received per time unit by an operation mode adjustment device is a meaningful criterion for judging whether a shop environment is present or not. Based on reference measurements, a reasonable threshold value of received signals per time unit can be estimated as a basis for a reliable decision. A home environment may be assumed to be present if the counted number of signals received per time unit is smaller than or equal to the threshold value. The presence of a shop environment may be assumed when the counted number of signals received per time unit exceeds the threshold.

The adjusting means may be adapted to adjust an operation mode based on a reflection characteristic of an identification signal detected by the detecting means, and reflected by an environment in which an electronic product connected or connectable to the operation mode adjustment device is currently located. As already mentioned above, the reflection characteristics of a signal (including absorption characteristics) are reliable criteria for judging whether a shop or a home environment is present.

Within the scope of the latter embodiment, a reflection profile storage means may be provided in the operation mode adjustment device and may be adapted to store a plurality of reflection profiles which are characteristic of different environments, wherein the adjusting means may be adapted to compare reflection characteristics of an identification signal detected by the detecting means with any one of the plurality of reflection profiles. To obtain such profiles, the reflection characteristics may be measured in a plurality of different environments (for instance, in a plurality of different home environments and in a plurality of different shop environments). When, during use of the electronic product including the operation mode adjustment device, a particular reflection profile is measured during use of the electronic product, a pattern matching operation can be performed, i.e. a comparison of the different stored reflection patterns with the current reflection characteristics. Based on the best agreement between one of the pre-stored reflection profiles and the current reflection characteristics, the decision may be taken whether a home or a shop environment is present.

Preferred embodiments of the electronic product will be described hereinafter. However, these embodiments also apply to the operation mode adjustment device, the method of adjusting an operation mode of an electronic product, the program element and the computer-readable medium.

The electronic product may be realized as an electronic entertainment device. Particularly, the electronic product may be realized as one of a group consisting of a television set (TV), a monitor, a video recorder, a CD player, a DVD player, a projector, an audio player, a computer game device, a cellular phone, a box, and a hi-fi system. Generally speaking, the electronic product may be any electronic product which is usually shown and/or sold to people (consumers) in a shop. All of these electronic products have in common that their operation in a home environment should be different than in a shop environment.

In one embodiment, the electronic product is realized as a display device (for instance, a liquid crystal display, a cathode ray tube, a plasma display or the like), wherein the adjusting means is adapted to adjust an operation mode based on whether the detected environment is a shop or a home environment. The display device may be operated with a better picture quality when the detected environment is a shop environment as compared to a home environment. Alternatively, in a shop environment, a special demo may be presented or shown with the device. A better picture quality particularly relates to a higher brightness and/or richer colors. In a shop environment, the display device should show its maximum quality. In a home environment, a high lifetime may be a more important issue. In addition or alternatively to a high picture quality, a shop operation mode may include an improved audio quality as compared to a home environment.

In another embodiment, the electronic product may be realized as a replay device having a reception unit for receiving a medium containing content to be replayed. The replay device may be operated in such a way that a medium received by the reception unit is prevented from being removed by a client when the detected environment is a shop environment. Such a replay device may be, for instance, a video recorder, a CD player, a DVD player, an audio player or a computer game device. To present such an electronic product to a user in a shop, a content medium (for instance, a video cassette, a CD, a DVD or a computer game module) may be inserted into the reception unit to reproduce content. In order to prevent theft or unauthorized removal of such a medium, removal of the medium from the reception unit in a shop environment may be precluded. In contrast to this, in a home environment, a person may have full access to the reception unit, for instance, when a user wishes to change a CD to be replayed by a CD player.

These and other aspects of the invention are apparent from and will be elucidated with reference to the embodiments described hereinafter.

BRIEF DESCRIPTION OF THE DRAWINGS

The invention will be described in more detail hereinafter with reference to non-limiting examples of embodiments.

DESCRIPTION OF EMBODIMENTS

Figure 1:
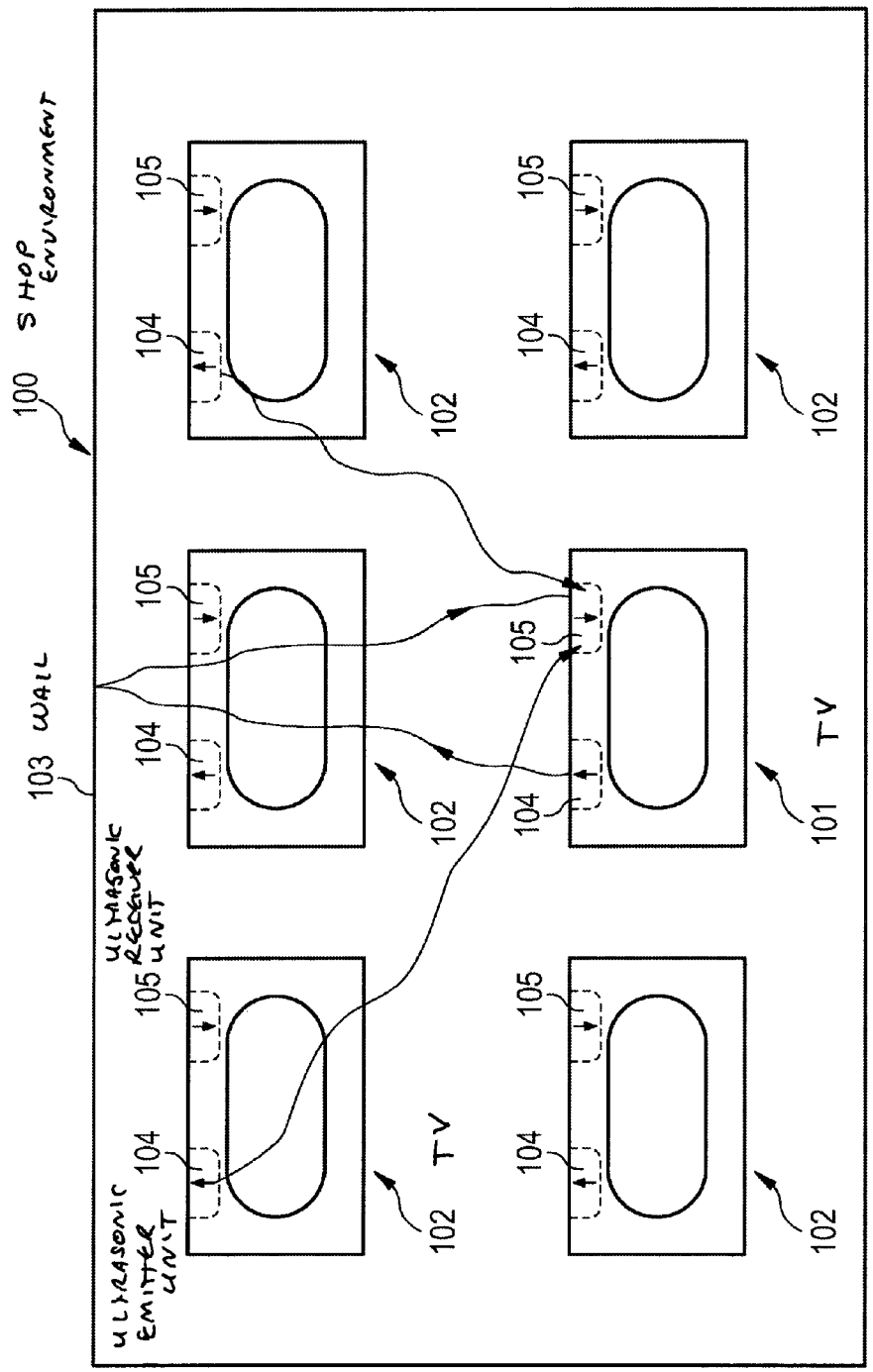
FIG. 1 shows a plurality of TVs in a shop environment.

The illustrations in the drawings are schematic. In the different drawings, similar or identical elements are denoted by the same reference numerals.

A shop environment 100 having a TV 101 comprising an operation mode adjustment device according to an embodiment of the invention will now be described in detail with reference to FIG. 1.

FIG. 1 shows a shop environment 100, which in the present case is an electronic product shop with an array of TVs. A plurality of TVs, inter alia, a TV 101 under consideration and a plurality of other TVs 102 are presented to potential clients or consumers visiting the shop 100. In order to demonstrate the performance of the TVs 101, 102 to the potential clients, the TVs 101, 102 are electrically connected to a power supply system and are switched on.

A wall 103 delimits the shop environment 100 to a presentation room containing the TVs 101, 102 located inside the wall 103. Each TV 101, 102 comprises an ultrasonic emitter unit 104 and an ultrasonic receiver unit 105 which are part of an operation mode adjustment device (not shown in FIG. 1) included in each TV 101, 102.

Such an operation mode adjustment device is adapted to adjust an operation mode of the TVs 101, 102, and comprises a detector for automatically detecting whether an environment in which a respective one of the TVs 101, 102 is currently located is a shop environment 100. An adjusting means then automatically adjusts the operation mode of the TV 101, 102 based on the result of the detection, which depends on the detected environment.

An ultrasound emitter unit 104 of each TV 101, 102 may emit an ultrasound wave. Furthermore, each TV 101, 102 includes an ultrasonic receiver unit 105 which may receive ultrasonic waves. As can be seen in FIG. 1, the TV 101 has emitted an ultrasonic wave from the ultrasonic emitter unit 104. This wave is partially reflected and partially absorbed by a wall 103 delimiting the shop environment 100 so that the ultrasonic receiver unit 105 can measure a reflected signal. Such a reflected signal is characteristically delayed with respect to the emitted signal and is damped with respect to the emitted signal in a way that is characteristic of a shop environment 100. This is due to the fact that shop environments are frequently designed in a similar manner so that reflection and absorption characteristics in such shop environments clearly differ from a typical home environment. The operation mode adjustment device inside the TV 101 can thus take these reflection characteristics as a basis for a decision whether the current environment is considered to be a shop environment 100 or a home environment.

Furthermore, the ultrasonic receiver unit 105 receives ultrasonic waves from each of the other TVs 102, since the other TVs 102 periodically emit ultrasonic waves as identification signals. Since a plurality of TVs 101, 102 is present in the shop environment 100, the number of received ultrasound wave signals that may be received per time unit by the ultrasonic receiver unit 105 of the TV 101 is comparatively large in the case of the shop environment 100. If the operation mode adjustment device of the TV 101 detects that the number of ultrasound signals received per time unit exceeds a predefined threshold, the operation mode adjustment device within the TV 101 concludes that the current environment is a shop environment.

When the presence of a particular kind of environment has been detected by the detecting means, the operation mode appropriate for the current shop environment 100 is adjusted accordingly. Since it is usually desired to present products in a particularly attractive manner, the TV 101 is operated in the shop environment 100 with a high picture quality mode, i.e. with a high brightness and rich colors.

Figure 2:
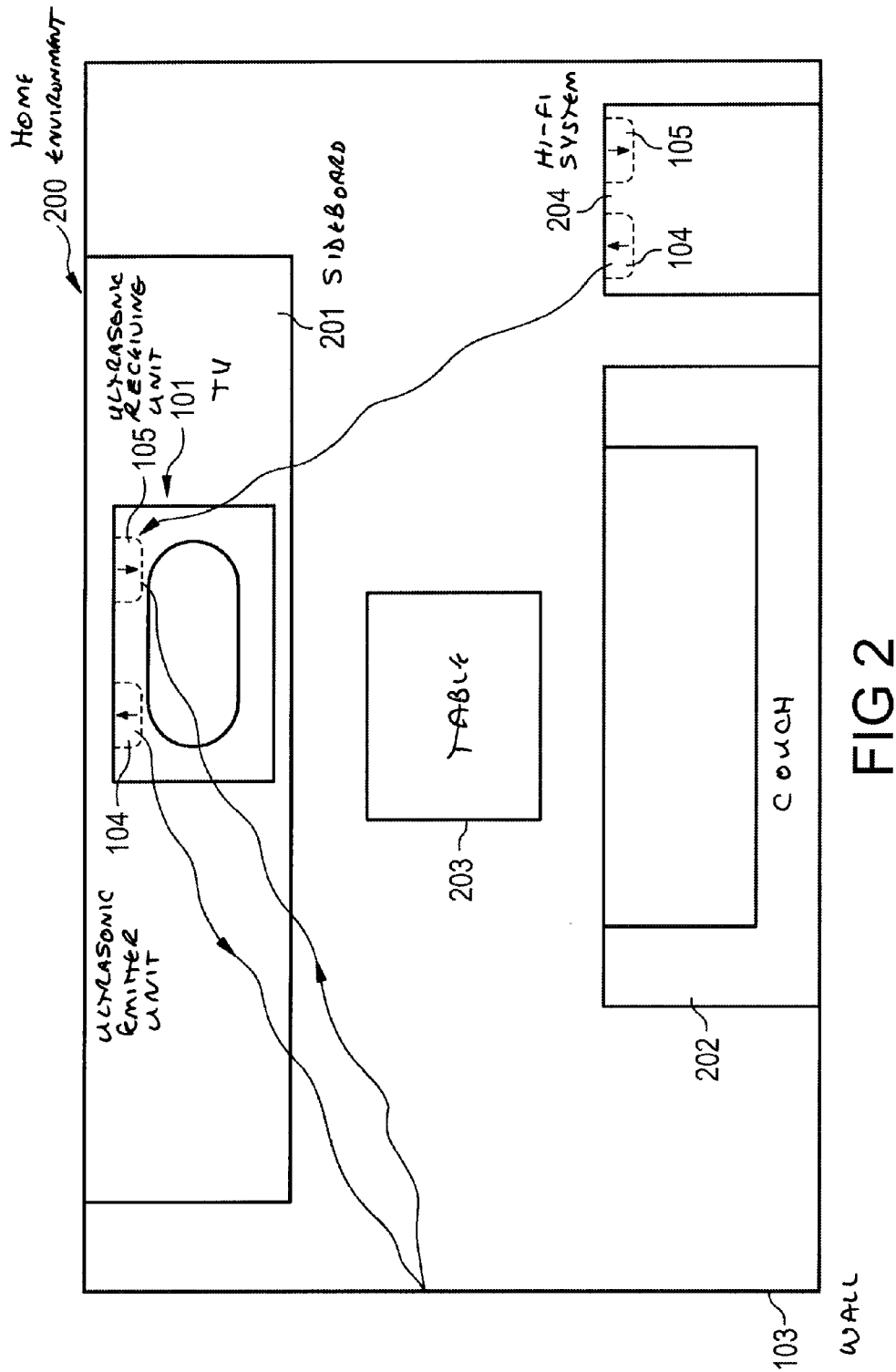
FIG. 2 shows a TV in a home environment.

FIG. 2 shows the TV 101 in a home environment 200, i.e. in a living room of a client who has bought the TV 101 in the shop environment 100.

After the TV 101 has been placed in the home environment 200, i.e. a room having a sideboard 201, a couch 202, a table 203 and a hi-fi system 204, and after the TV 101 is switched on, the ultrasonic emitter unit 104 periodically emits ultrasonic sound signals, and the ultrasonic receiver unit 105 is ready to receive ultrasound signals. However, since the other TVs 102 are absent in the home environment 200, no ultrasonic sound signals can be detected by the ultrasonic receiver unit 105 originating from these TVs 102.

However, the hi-fi system 204 arranged in the living room 200 is also provided with an operation mode adjustment device (particularly with elements 104, 105) and is thus adapted to periodically emit ultrasonic waves which can be received by the ultrasonic receiver unit 105 of the TV 101. However, only a few electronic apparatuses having an operation mode adjustment device are present in the home environment 200 (as is typical of many home environments). Thus, although the ultrasonic receiver unit 105 of TV 101 occasionally receives an ultrasonic signal from the hi-fi system 204, the number of ultrasonic sounds received per time unit is below the predetermined threshold value so that the detection means within the TV 101 recognize that the current environment is a home environment 200 and not a shop environment.

Furthermore, the ultrasonic receiver unit 105 of the TV 101 can detect ultrasonic waves emitted by the ultrasonic emitter unit 104 of this TV 101 and reflected on the wall 103. However, although the typical dimensions, wall materials and further apparatuses within the home environment 200 significantly differ from a typical shop environment 100, the reflection and absorption characteristics of these ultrasonic waves are different in the home environment 200 as compared to the shop environment 100.

The operation mode adjustment device of the TV 101 concludes from the detected ultrasonic signals that the TV 101 is now located in the home environment 200 and no longer in the shop environment 100. Consequently, the adjusting means within the operation mode adjustment device adjusts an operation mode of the TV 101 so that the picture quality of the TV 101 guarantees a long lifetime.

A TV 300 including an operation mode adjustment device 309 for adjusting an operation mode of the TV 300 will now be explained with reference to FIG. 3.

The operation mode adjustment device 309 comprises a detector unit 303 for automatically detecting whether an environment in which the TV 300 is currently located is a shop environment. Furthermore, an adjusting unit 304 is provided for automatically adjusting an operation mode of the TV 300 on the basis of the detected environment in which the TV 300 is currently located. The detector unit 303 is adapted to receive, via a microphone 305, an identification signal, namely an ultrasonic input wave 301, emitted by another operation mode adjustment device (not shown) for adjusting an operation mode of another TV (not shown).

Moreover, the detector unit 303 is adapted to receive, via the microphone 305, an identification signal, namely an ultrasonic input wave 301, emitted by the operation mode adjustment device 309 (more precisely emitted as an ultrasonic output wave 302 by an ultrasonic speaker 306) and reflected by an environment in which the TV 300 is currently located. The operation mode adjustment device 309 thus comprises an ultrasonic speaker 306 as an emitter unit adapted to emit an ultrasonic output wave 302 as an identification signal. The ultrasonic speaker 306 is adapted to periodically emit an ultrasonic output wave 302. This means that there is a constant time interval between two subsequent ultrasonic waves 302. The ultrasonic output wave 302 emitted by the ultrasonic speaker 306 includes information that the TV 300 is related to the Philips™ company.

An adjustment unit 304 is coupled with the detector unit 303 and is adapted to adjust an operation mode based on whether the detected environment is a shop environment (see FIG. 1) or a home environment (see FIG. 2). In order to take this decision in a meaningful manner, the detector unit 303 may access a reflection profile database 307 in which a plurality of reflection profiles is stored. These reflection profiles contain ultrasonic wave patterns which are characteristic of different kinds of home environments or different kinds of shop environments. The reflection profile database 307 may be realized as a storage device, for instance, a DRAM ("dynamic random-access memory"), a SRAM ("static random-access memory"), a flash memory or an EEPROM ("electrically erasable programmable read-only memory").

The detector unit 303 may implement a conventional pattern matching method to check which pattern stored in the reflection profile database 307 fits best with the reflection profile of an ultrasonic input wave 301 which results from a reflection/absorption by the environment and has been emitted by the ultrasonic speaker 306 of the operation mode adjustment device 309.

After having determined which environment is most likely present, this decision is transmitted from the detector unit 303 to an adjustment unit 304 which may access an operation mode database 308 containing a plurality of predefined parameter sets each corresponding to a desired operation mode being appropriate for the current environment. The operation mode database 308 may comprise a set of parameters determining the picture and/or the audio quality of the TV 300. This picture quality can be high if the detected environment is a shop environment and can be lower if the detected environment is a home environment.

Figure 3:
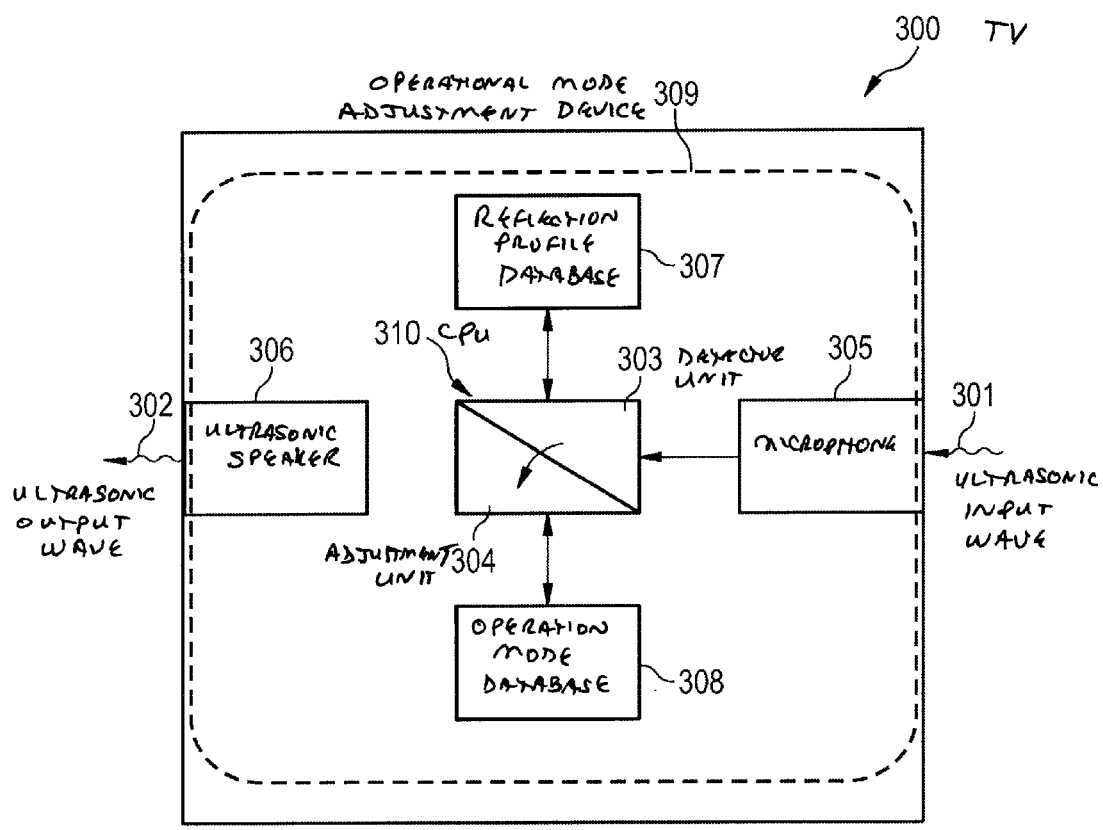
FIG. 3 shows an electronic product according to an embodiment of the invention.

In the embodiment shown in FIG. 3, units 303 and 304 are combined in a single central processing unit (CPU) 310, i.e. a microprocessor that may be formed in semiconductor technology.

It should be noted that use of the verb "comprise" and its conjugations does not exclude the presence of elements or steps other than those stated in the claims, and use of the indefinite article "a" or "an" preceding an element or step does not exclude the presence of a plurality of such elements or steps. Moreover, elements described in association with different embodiments may be combined.

It should also be noted that reference signs in the claims shall not be construed as limiting the scope of the claims.

The invention claimed is:

1. An operation mode adjustment device for adjusting an operation mode of an electronic product, wherein the operation mode adjustment device comprises:
   detecting means for automatically detecting whether an environment in which the electronic product connectable to the operation mode adjustment device is currently located is a shop environment;
   adjusting means for automatically adjusting an operation mode of the electronic product based on whether the detected environment in which the electronic product is currently located is a shop environment; and,
   wherein the detecting means is adapted to receive an identification signal emitted by another operation mode adjustment device for adjusting an operation mode of another electronic product.

2. The operation mode adjustment device according to claim 1, wherein the detecting means is adapted to receive an ultrasonic signal or an electromagnetic radiation signal as an identification signal.

3. The operation mode adjustment device according to claim 2, wherein the detecting means is adapted to receive a high-frequency signal or an infrared signal as an electromagnetic radiation signal.

4. The operation mode adjustment device according to claim 1, wherein the adjusting means is adapted to adjust an operation mode based on a number of identification signals emitted per time unit by other operation mode adjustment devices and detected by the detecting means.

5. The operation mode adjustment device of claim 1 wherein the operation mode adjustment device is selected from one of a group consisting of a television, a monitor, a video recorder, a CD player, a DVD player, a projector, an audio player, a computer game device, a cellular phone, a box, and a hi-fi system.

6. The operation mode adjustment device of claim 1 wherein the operation mode adjustment device is a display device wherein the adjusting means is adapted to adjust an operation mode based on whether the detected environment is the shop environment or a home environment; and
   the display device is operated with a better picture quality when the detected environment is the shop environment as compared to the case when the detected environment is the home environment.

7. The operation mode adjustment device of claim 1 wherein the operation mode adjustment device is a replay device having a reception unit for receiving a medium containing content to be replayed wherein the replay device is operated such that a medium received by the reception unit is prevented from being removed by a client when the detected environment is the shop environment.

8. An operation mode adjustment device for adjusting an operation mode of an electronic product connectable to the operation mode adjustment device, wherein the operation mode adjustment device comprises:
   detecting means for automatically detecting whether an environment in which the electronic product connectable to the operation mode adjustment device is currently located is a shop environment;
   adjusting means for automatically adjusting an operation mode of the electronic product based on whether the detected environment in which the electronic product connectable to the operation mode adjustment device is currently located is a shop environment; and,
   wherein the detecting means is adapted to receive an identification signal emitted by the operation mode adjustment device and reflected by an environment in which an electronic product connectable to the operation mode adjustment device is currently located.

9. The operation mode adjustment device according to claim 8, comprising an emitter unit adapted to emit the identification signal.

10. The operation mode adjustment device according to claim 9, wherein the emitter unit is adapted to periodically emit the identification signal.

11. The operation mode adjustment device according to claim 9, wherein the emitter unit is adapted to emit the identification signal including information that the electronic product is related to a particular company.

12. The operation mode adjustment device according to claim 9, wherein the emitter unit is adapted to emit an ultrasonic signal or an electromagnetic radiation signal as the identification signal.

13. The operation mode adjustment device according to claim 12, wherein the emitter unit is adapted to emit a high-frequency signal or an infrared signal as an electromagnetic radiation signal.

14. The operation mode adjustment device according to claim 8, wherein the adjusting means is adapted to adjust an operation mode based on reflection characteristics of the identification signal detected by the detecting means and reflected by an environment in which an electronic product connectable to the operation mode adjustment device is currently located.

15. The operation mode adjustment device according to claim 14, comprising a reflection profile storage means adapted to store a plurality of reflection profiles each being characteristic of a particular environment, wherein the detection means is adapted to compare reflection characteristics of the identification signal detected by the detecting means with any one of the plurality of reflection profiles.

16. A method of adjusting an operation mode of a first electronic product, the method comprising the steps of:
   receiving, by the first electronic product, an identification signal emitted by an operation mode adjustment device that adjusts an operation mode of a second electronic product;
   automatically detecting whether an environment in which the first electronic product is currently located is a shop environment by analyzing a frequency of occurrence of the received identification signal; and
   automatically adjusting an operation mode of the first electronic product based on whether the detected environment in which the first electronic product is currently located is a shop environment.

17. A non-transitory computer-readable medium, in which a computer program is stored which, when being executed by a processor, is adapted to carry out a method of adjusting an operation mode of a first electronic product, the method comprising the steps of:
- receiving, by the first electronic product, an identification signal emitted by an operation mode adjustment device that adjusts an operation mode of a second electronic product;
- automatically detecting whether an environment in which the first electronic product is currently located is a shop environment by analyzing a frequency of occurrence of the received identification signal; and
- automatically adjusting the operation mode of the first electronic product based on whether the detected environment in which the first electronic product is currently located is a shop environment.

* * * * *